United States Patent [19]

Horie

[11] Patent Number: 5,717,836
[45] Date of Patent: Feb. 10, 1998

[54] PRINTING APPARATUS HAVING A RETRACTABLE CURL REMOVAL MEMBER AND REVERSIBLE ROLLER

[75] Inventor: Atsuyuki Horie, Fukuoka, Japan

[73] Assignee: Matsushita Electric Industrial Co., Ltd., Osaka, Japan

[21] Appl. No.: 606,439

[22] Filed: Feb. 23, 1996

[30] Foreign Application Priority Data

Mar. 9, 1995 [JP] Japan .................................. 7-049613
Mar. 9, 1995 [JP] Japan .................................. 7-049614

[51] Int. Cl.[6] .............................. H04N 1/04; B41B 1/00; G06F 15/00
[52] U.S. Cl. .................. 395/101; 395/111; 358/498; 399/385; 399/406
[58] Field of Search ........................... 358/296, 498; 399/385, 386, 387, 388, 406; 395/101, 104, 109, 111, 113

[56] References Cited

U.S. PATENT DOCUMENTS

5,267,800  12/1993  Petteruti et al. ................ 395/101
5,448,374   9/1995  Yokoyama et al. ............... 358/498

Primary Examiner—Edward L. Coles, Sr.
Assistant Examiner—Kimberly A. Williams

[57] ABSTRACT

In a printing apparatus, recording paper is fed from a paper roll to a platen roller, and is printed by a print head by an amount corresponding to one page, and then the printed recording paper is cut by a cutter. A curl removal member for removing a curl from the recording paper is shifted into an operative or curl-removing-position, and flexes or curves the recording paper from the paper roll, thereby removing a curl thereof. For finishing the printing operation after cutting the recording paper, the curl removal member is shifted into an inoperative position where it does not flex the recording paper, and the platen roller is rotated in a normal direction to remove a slack from that portion of the recording paper extending between the paper roll and the print head. For starting the printing operation, the platen roller is rotated in a reverse direction, and the curl removal member is shifted into the operative position to flex the recording paper, and then the printing of the recording paper is started.

10 Claims, 11 Drawing Sheets

PRINTING APPARATUS HAVING A RETRACTABLE CURL REMOVAL MEMBER AND REVERSIBLE ROLLER

BACKGROUND OF THE INVENTION

This invention relates to a printing apparatus used in an apparatus (e.g. facsimile machine) having a printing function.

In a printing apparatus such as a facsimile machine, it is a common practice to remove a curl from recording paper (e.g. thermosensitive or thermal paper) by a recording paper curl-removing device in order to provide the good appearance of the printed recording paper and also to prevent the jamming of the recording paper.

Figure 13:
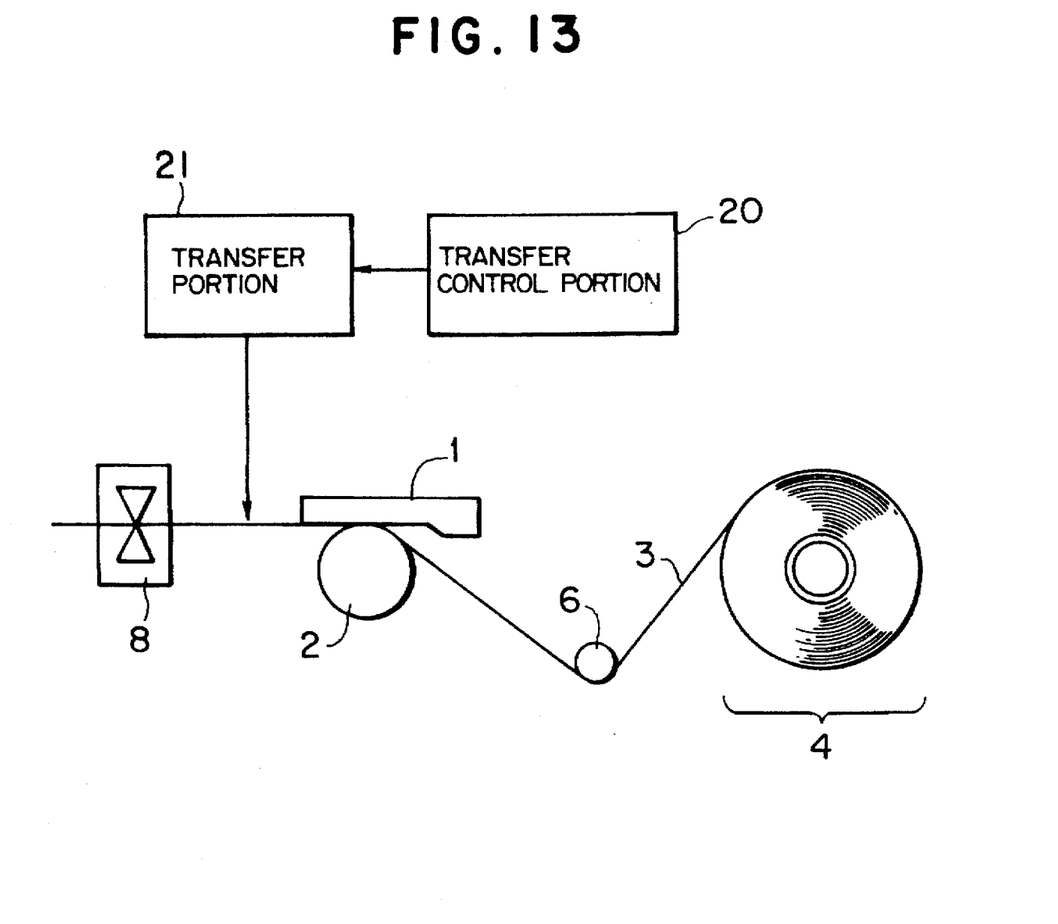
FIG. 13 is a schematic illustration of a conventional printing apparatus.

One conventional printing apparatus will now be described with reference to the drawings. FIG. 13 shows a general construction of the conventional printing apparatus. As shown in FIG. 13, this printing apparatus comprises a print head 1 for imprinting characters and the like on recording paper 3, a platen roller 2 cooperating with the print head 1 to hold the recording paper 3 therebetween, a rolled recording paper supply portion 4, a curl removing rod 6 provided between the rolled recording paper supply portion 4 and the platen roller 2, a cutter 8 for cutting the recording paper 3 into a predetermined size or length, a transfer control portion 20, and a transfer portion 21 controlled by the transfer control portion 20 so as to reciprocally move the unprinted recording paper 3 by a predetermined amount after the recording paper 3 is cut by the cutter 8.

The recording paper curl-removing operation in the printing apparatus of the above construction will now be described. During the printing of the recording paper 3 by the print head 1, the recording paper 3, extended around the curl removal rod 6, is transferred or fed by the transfer portion 21, and at this time a curl is removed from the recording paper 3 through press-contact thereof with the curl removal rod 6 during the transfer of the recording paper 3 by the transfer portion 21.

Then, when one page-printing on the recording paper 3 is completed, this one page-printed portion of the recording paper 3 is cut into the predetermined size by the cutter 8, and then under the control of the transfer control portion 20, the transfer portion 21 reciprocally moves the unprinted recording paper 3 by the predetermined amount, so that the recording paper 3 is moved back toward the rolled recording paper supply portion 4. As a result, the tension of the recording paper 3 is eliminated, so that the recording paper 3 is brought out of press-contact with the curl removal rod 6, and therefore the curling of the recording paper 3 is suppressed to a certain degree.

In the above conventional construction, however, when the printing is not effected for a long period of time, the slackened recording paper is kept curved, and this has resulted in a problem that a curve-remaining portion is formed at an end of the recording paper. If such a curve-remaining portion is produced on the recording paper, the printed paper sheet, cut from the continuous recording paper, often fails to be properly positioned in a stacker (not shown).

SUMMARY OF THE INVENTION

With the above problems of the prior art in view, it is an object of this invention to provide a printing apparatus in which a curl is removed from recording paper during ordinary transfer of the recording paper, and besides when the recording paper is transferred even after the printing apparatus is stopped for a long period of time, a curve-remaining portion will not be formed on the recording paper.

According to one aspect of the present invention, there is provided a printing apparatus comprising control means for rotating a transfer roller in a reverse direction when starting printing so as to move recording paper back, stopping the reverse rotation of the transfer roller when the leading edge of the recording paper reaches a predetermined position near to a print head, then, starting rotation of the transfer roller in a normal direction so as to perform printing, and operating a cutter so as to cut off the recording paper and thereafter the rotating the transfer roller by a predetermined degree in the normal direction so as to feed the recording paper more or less before the printing is completed. This normal rotation of the transfer roller removes a slack from the recording paper.

According to another aspect of the invention, there is provided a printing apparatus comprising a cutter having a closable blade for cutting recording paper and located to at a distance from a transfer roller closer to a paper outlet port; first control means for rotating a transfer roller in a reverse direction when starting printing so as to move the recording paper back, for stopping the reverse rotation of the transfer roller when a leading edge of the recording paper reaches the position of a print head, and subsequently starting the rotation of said transfer roller in a normal direction so as to carry out printing; second control means for driving the cutter, if subsequently printing a next page, so as to cut the recording paper, then promptly rotating the transfer roller in the reverse direction to move the recording paper back, and stopping the reverse rotation of the transfer roller when the leading edge of the recording paper reaches the position of said print head, so as to stop the leading edge of the recording paper at the position of said print head; and third control means for driving the cutter when stopping the printing, so as to cut the recording paper, then retracting a curl removal member, and rotating said transfer roller by a predetermined degree in the normal direction to feed the recording paper more or less. With this construction, when a plurality of pages are to be printed, the curl removal member is not moved before the printing of the last page is finished, and after the printing of the last page is finished, the curl removal member is retracted, and the transfer roller is rotated in the normal direction by the predetermined degree to feed the recording paper. Therefore, the time required for the printing is reduced.

According to a further aspect of the invention, there is provided a printing apparatus comprising a motor serving as drive means for rotating a transfer roller, and also serving as drive means for driving a cutter; switch means for establishing and cutting off a power transmission line between said cutter and said motor; a paper sensor provided between a print head and said cutter for detecting a leading edge of recording paper; first control means for rotating the transfer roller in a reverse direction when starting printing, so as to move the recording paper back, stopping the reverse rotation of the transfer roller in accordance with a signal delivered from the paper sensor when the paper sensor detects the leading edge of the recording paper reaching the position of said print head, causing said switch means to establish the power transmission line, and starting the rotation of said transfer roller in a normal direction, so as to effect printing; second control means for driving said motor when subsequently printing a next page so as to drive said cutter to cut the recording paper, then promptly rotating the transfer roller in the reverse direction to move the recording paper back, and stopping the reverse rotation of the transfer roller when the paper sensor delivers a detection signal indicating that the recording paper reaches the position of said print head, so as to stop the leading edge of the recording paper at the position of said print head; third control means for rotating the motor when stopping the printing, so as to drive said cutter to cut the recording paper, and then by rotating the transfer roller in the normal direction by a predetermined degree after a blade of the cutter is opened so as to feed the recording paper more or less, and effecting said switch means to cut off the power transmission line between the cutter and the motor; and fourth control means for rotating the transfer roller in the reverse direction when printing, so as to move the recording paper back until the paper sensor delivers a detection signal, whereby occurrence of paper jamming is recognized when the paper sensor does not deliver a detection signal indicating that the leading edge of the recording paper is detected even though the transfer roller is rotated in the reverse direction by a degree exceeding the predetermined degree, and then promptly stopping the rotation of the transfer roller while effecting said switch means so as to cut off the power transmission line between the cutter and the motor. With this construction, when the jamming of the recording paper is detected, the switch means is switched so as to cut off the power transmission line, thereby it is possible to easily open the blade of the cutter.

DESCRIPTION OF THE PREFERRED EMBODIMENT

A preferred embodiment of the present invention will now be described with reference to the drawings.

Figure 1:
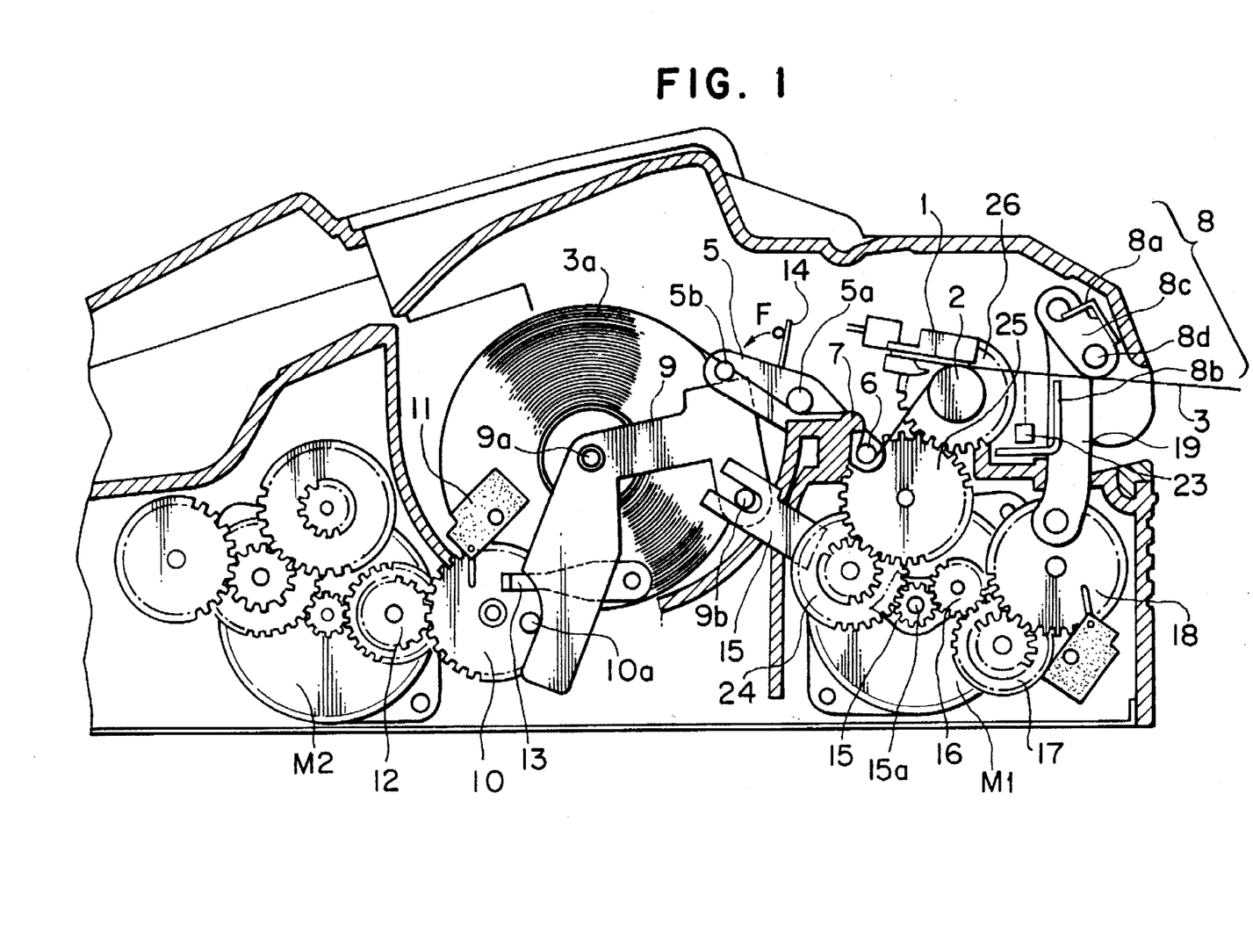
FIG. 1 is a view showing the construction of a facsimile machine comprising a preferred embodiment of a printing apparatus of the present invention.
Figure 2:
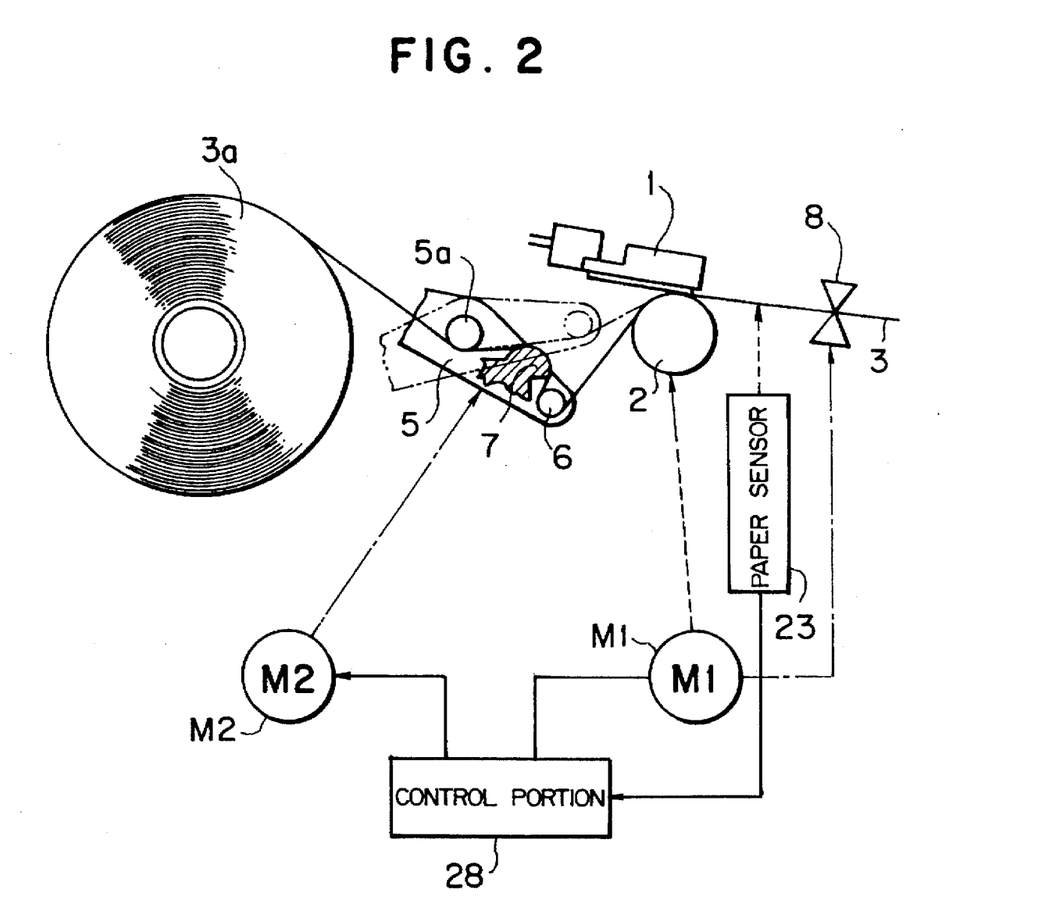
FIG. 2 is a schematic illustration of the printing apparatus shown in FIG. 1.

FIG. 1 is a view showing the construction of a facsimile machine comprising one preferred embodiment of a printing apparatus of the invention, and FIG. 2 is a schematic block diagram of this printing apparatus.

In FIGS. 1 and 2, the printing apparatus comprises a print head 1, a platen/transfer roller 2, and a roll 3a of recording paper 3 from which recording paper is paid off.

An arm 5 drives a curl removal rod 6, and this arm 5 is pivotally movable about a pivot pin 5a, and has an action-receiving point 5b. The arm 5 holds the curl removal rod 6, and is adapted to pivot over a predetermined angle about the pivot pin 5a. More specifically, when printing the recording paper 3, a right end of the arm 5 is lowered or moved downward as indicated in solid lines in FIG. 3 to lower the curl removal rod 6. When the printing operation is stopped, the right end of the arm 5 is raised or moved upward as indicated by broken lines to lift the curl removal rod 6.

Further, an introduction guide 7 is positionally fixed.

A cutter 8 has an upper blade 8a and a lower blade 8b. A holder plate 8c holds the upper blade 8a at its opposite ends, and is pivotally movable about a pivot pin 8d. The lower blade 8b is fixed. When the holder plate 8c pivots about the pivot pin 8d, the upper blade 8a is lowered, and cooperates with the lower blade 8b to cut the recording paper 3 held between the two blades 8a and 8b.

A positioning arm 9 pivots about a pivot pin 9a. Reference numeral 10 denotes a crank gear, and reference numeral 11 denotes a switch. A one-way gear 12 is provided between and meshingly engaged with a pinion gear of a motor M2 and the crank gear 10. A stopper spring 13 holds the crank gear 10 against rotation when the motor M2 rotates in its normal direction.

A motor M1 serves as a power source for transferring the recording paper 3 when receiving facsimile information, and also serves as a drive source for driving the cutter 8. The motor M2 serves as a power source for feeding a document when transmitting facsimile information, and also serves to switch the position of the positioning arm 9.

A spring 14 urges the arm 5 in a direction of arrow F (see FIG. 1), and when the positioning arm 9 is lowered, the arm 5 pivots in the direction of arrow F under the influence of this spring 14, so that the curl removal rod 6 is raised. The motor M2, the one-way gear 12, the crank gear 10, the positioning arm 9 and so on jointly constitute a rod position control mechanism portion for removing a curl.

An arm 15 serves to switch the supply of the power of the motor M1 to one of a plurality of destinations, and is pivotally movable about a pivot pin 15a. A switch gear (switch portion) 16, a one-way gear 17, a crank gear 18 and a crank arm 19 are provided for driving the upper blade 8a of the cutter 8. The crank arm 19 is pivotally connected at its distal end to the holder plate 8c. Reference numeral 16a denotes an axis of rotation of the switch gear 16 mounted on the arm 15.

A paper sensor 23 is provided between the cutter 8 and the platen roller 2. Reference numerals 24 and 25 denote idler gears, respectively, and reference numeral 26 denotes a platen gear.

Figure 4:
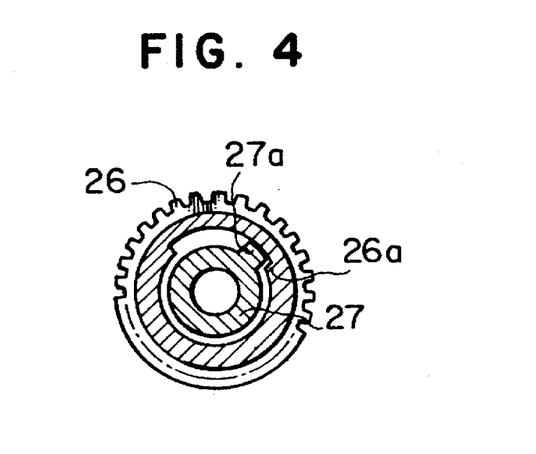
FIG. 4 is a cross-sectional view showing a delay mechanism in the printing apparatus.

A delay mechanism is provided in the platen gear 26 as shown in FIG. 4. Roller shafts 27 support the platen roller 2 at opposite ends of the platen roller 2, and a projection 27a is formed on one of the roller shaft 27. During the time when a wall 26a, formed on the platen gear 26, is out of engagement with the projection 27a, the power is not transmitted from the platen gear 26, and when the wall 26a is brought into engagement with the projection 27a, the power is transmitted from the platen roller 26 to the platen roller 2, so that the platen roller 2 begins rotating.

In FIG. 2, a control portion or controller 28 controls the various portions of the printing apparatus, and in accordance with a signal from the paper sensor 23 and other information, this control portion 28 feeds a signal to the print head 1, drives the motors M1 and M2, and causes other operations to be effected.

The relationship of the various portions, as well as their arrangement and functions, will now be described in detail.

The print head 1, the arm 5 and the curl removal rod 6 are mounted on an openable lid so that the roll 3a (of recording paper 3) can be easily set in position and that the recording paper 3 can be easily drawn from the paper roll 3a to be set into position.

Figure 3:
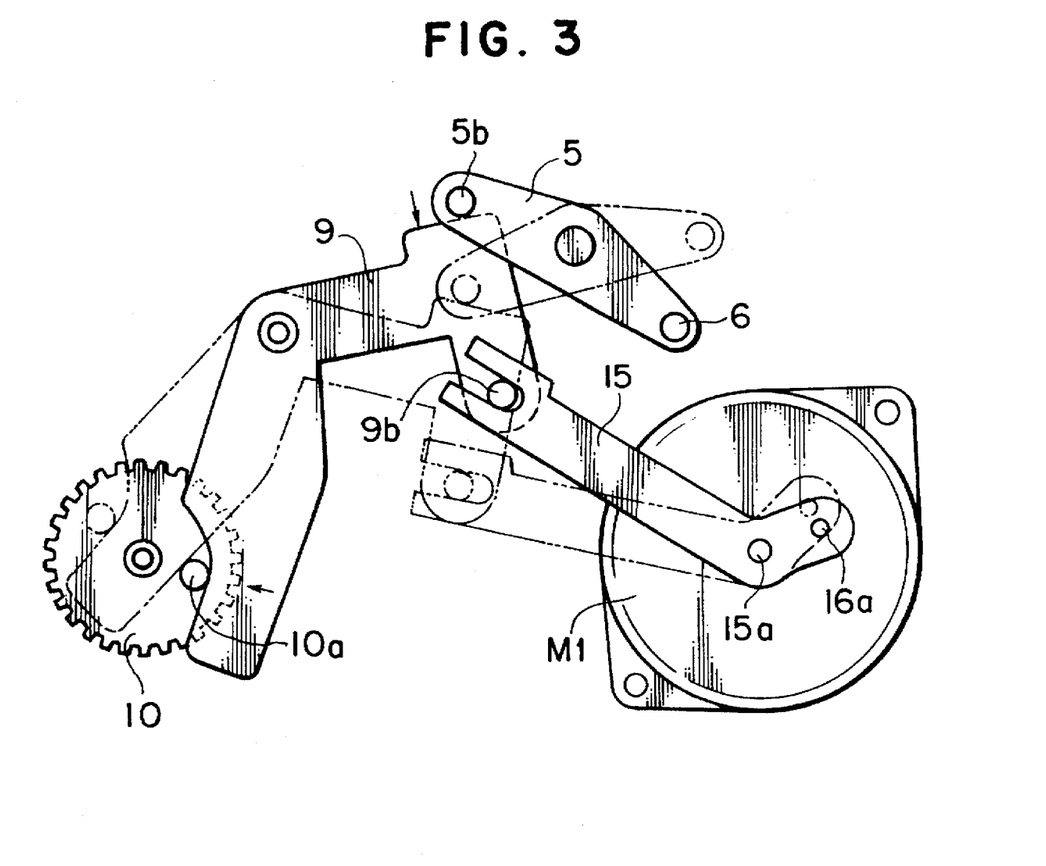
FIG. 3 is a view explanatory of a pivotal movement of an arm holding a curl removal rod in the printing apparatus.

The positioning arm 9 is pivotally moved over the predetermined angle about the pivot pin 9a to transmit the motion to the arm 5 through the action-receiving point 5b, as shown in FIG. 3. The arm 5 is always held in contact with the positioning arm 9 at the action-receiving point 5b under the influence of the spring 14. Since a projection 10a, formed on the crank gear 10, is held in contact with the proximal end portion of the positioning arm 9, the positioning arm 9 is driven or moved by the crank gear 10. The rotational position of the crank gear 10 is detected by the switch 11.

The one-way gear 12, comprising double spur gears, is provided between the pinion gear of the motor M2 and the crank gear 10, and when telefaxing or copying the document, the motor M2 is rotated in its normal direction to feed the document, and only when the motor M2 is rotated in its reverse direction, the crank gear 10 is rotated.

The pivotal movement of the positioning arm 9 is transmitted to the arm 5, and this motion of the positioning arm 9 is also utilized to move the curl removal rod 6. The pivotal movement of the positioning arm 9 is also transmitted to the arm 15 through a point 9b of application, and is utilized to move the switch gear 16.

The switch gear 16 is mounted on one end of the arm 15, and this switch gear 16 is always in mesh with a pinion of the motor M1. The arm 15 is pivotally movable by a predetermined angle about the pivot pin 15a, defined by a distal end of an output shaft of the motor M1 as shown in FIG. 3. The switch gear 16 is rotatably mounted on the one end of the arm 15, and only when the arm 15 is tilted right, the switch gear 16 meshes with the one-way gear 17, thereby transmitting the rotation of the motor M1 to the one-way gear 17. The one-way gear 17 has a double spur gear construction, and transmits the rotation to the crank gear 18 only when the motor M1 rotates in a direction (indicated by arrow E in FIG. 11) opposite to the direction of rotation of the motor M1 for feeding the recording paper 3. The rotational motion of the crank gear 18 is converted into a reciprocal movement of the crank arm 19, and this movement is transmitted to the upper blade 8a of the cutter 8 through the cutter holder 8c, so that the upper blade 8a cooperates with the lower blade 8b to cut the printed recording paper 3. The paper sensor 23 is provided between the cutter 8 and the platen roller 2, and after the cutter 8 cuts the recording paper 3, the platen roller 2 is rotated in a reverse direction, so that the cut edge (that is, leading edge) of the recording paper 3 passes past a detection point of the paper sensor 23.

The rotation or power of the motor M1 is transmitted to the platen roller 2 through a pinion gear, mounted on the rotational shaft (output shaft) of the motor M1, the idler gear 24, the idler gear 25 and the platen gear 26.

Because of the provision of the delay mechanism shown in FIG. 4, the platen roller 2 does not rotate in its reverse direction until the downwardly-moving upper blade 8a of the cutter 8 reaches an end of its closing stroke, and when the upper blade 8a of the cutter 8 begins moving upward in an open direction, the platen roller 2 begins rotating in its reverse direction. The platen roller 2 continues to rotate in the reverse direction to move the recording paper 3 back until the upper blade 8a is stopped at an end of its opening stroke. The rotation of the motor M1 is stopped in accordance with a detection signal delivered from the paper sensor 23 after the leading edge of the recording paper 3 passes past the detection point. A time period (or the amount of rotation) from the generation of the detection signal to the actual stopping of the motor M1 can be arbitrarily determined or set by a counter or the like, and the motor M1 continues to rotate until the leading edge of the recording paper 3 reaches a predetermined printing-starting position (where the print head 1 is located).

The stopper spring 13 prevents the rotation of the crank gear 10 when the motor M2 rotates in its normal direction. When the motor M2 rotates in its reverse direction, the crank gear 10 easily overcomes the stopper spring 13 to rotate.

When the crank gear 10 rotates to bring the projection 10a to a right-hand position indicated by a solid line in FIG. 3, the curl removal rod 6 is held in a position, indicated by a solid line in FIG. 3, through the positioning arm 9 engaged with the projection 10a (When the curl removal rod 6 is in this position, the printing of the recording paper 3 is effected). At the same time, the switch gear 16, mounted on the end of the arm 15, is brought into meshing engagement with the one-way gear 17. When the recording paper 3 is printed, the switch gear 16 is meshingly engaged with the one-way gear 17, but the upper blade 8a of the cutter 8 will not operate because of the above-mentioned double spur gear construction of the one-way gear 17.

When the projection 10a is brought to a left-hand position indicated by a broken line in FIG. 3, the curl removal rod 6 is held in a position indicated by a broken line in FIG. 3, and the switch gear 16 is out of meshing engagement with the one-way gear 17.

The operation of the facsimile machine of the above construction will now be described.

The operations of the various portions of this facsimile machine are controlled by the control portion 28.

Figure 5:
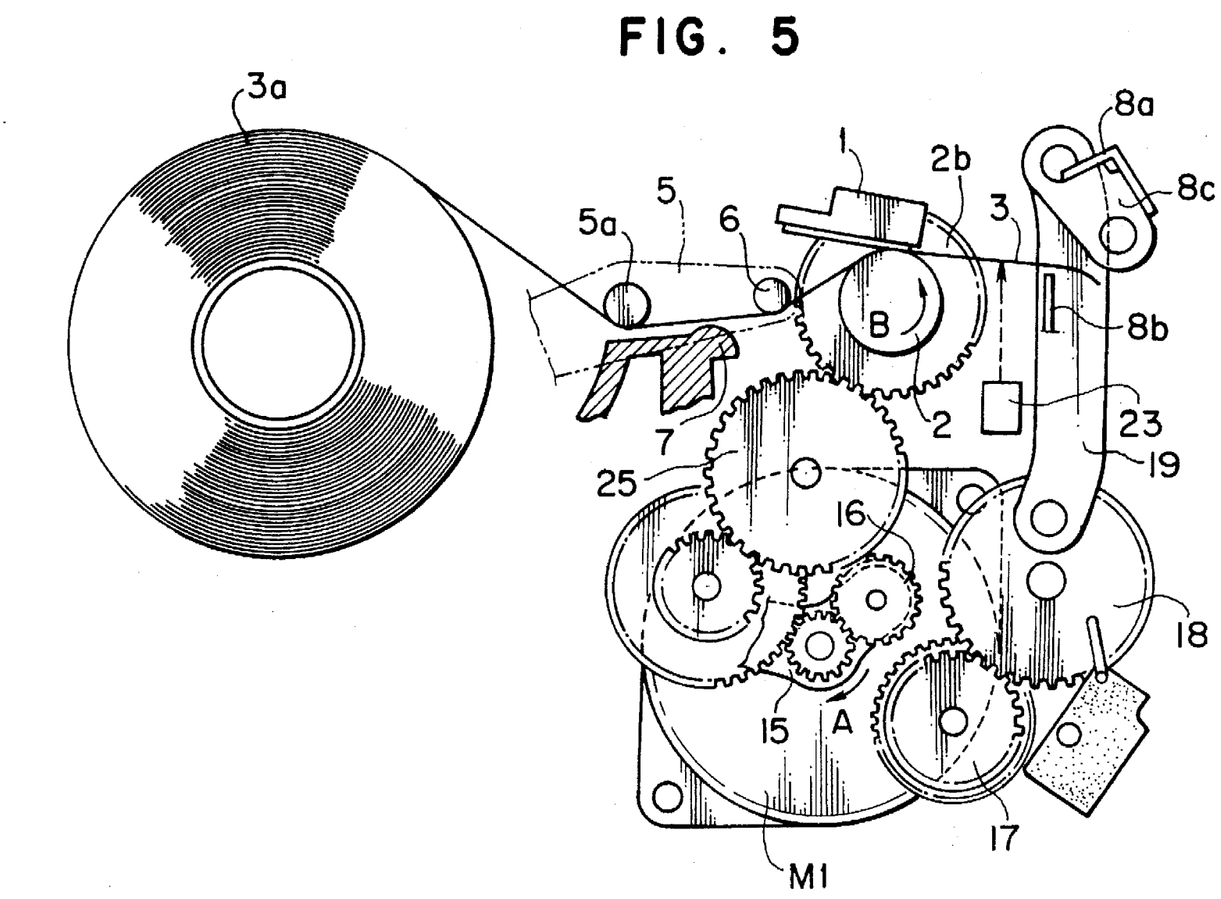
FIG. 5 is a view explanatory of a printing operation of the facsimile machine.
Figure 6:
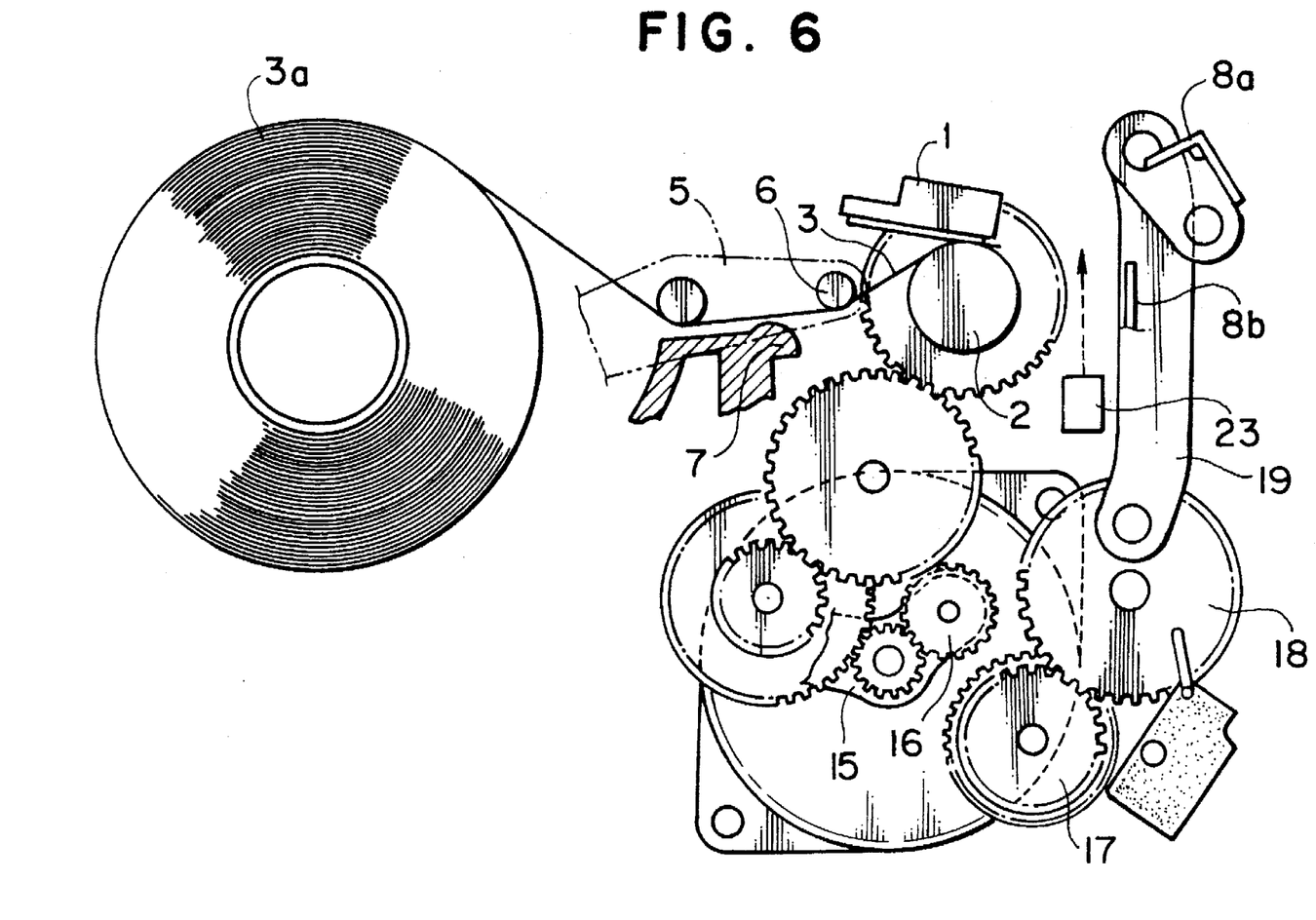
FIG. 6 is a view explanatory of the printing operation of the facsimile machine.

Reference is first made to the operations effected when starting the printing operation. The motor M1 is rotated in the reverse direction (that is, a direction of arrow A in FIG. 5) to rotate the platen roller 2 in the reverse direction (that is, a direction of arrow B) to move the leading edge of the recording paper 3 back to the position of the print head 1. Namely, after the paper sensor 23 delivers the detection signal when the leading edge of the recording paper 3 passes past the detection point of the paper sensor 23, the motor M1 continues to rotate a predetermined amount, and then is stopped. This condition is shown in FIG. 6.

Figure 7:
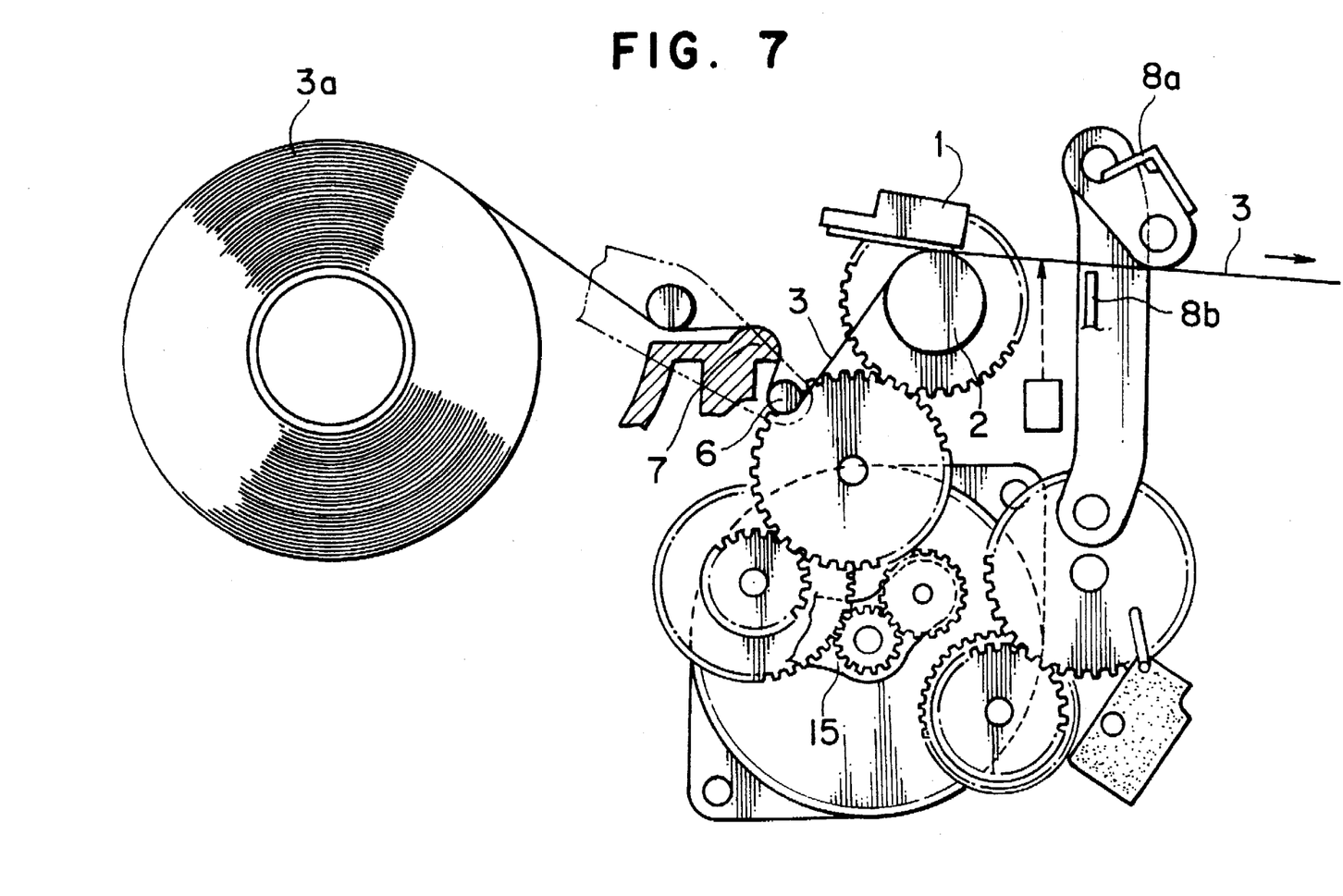
FIG. 7 is a view explanatory of the printing operation of the facsimile machine.

Then, the motor M2 is rotated in the normal direction to rotate the crank gear 10 through a predetermined angle. This rotational movement of the crank gear 10 is converted into the pivotal movement of the positioning arm 9, and this pivotal movement is further transmitted to the arm 5, so that the curl removal rod 6, mounted on the distal end of the arm 5, moves leftwardly downward as shown in FIG. 7.

The recording paper 3 is urged downwardly by the curl removal rod 6, and therefore is curved by the introduction guide 7 in a direction of increasing a curl thereof. However, since the radius of the introduction guide 7 is larger than that of the curl removal rod 6, the degree of curvature of the recording paper 3 by the introduction guide 7 is relatively low, and therefore the introduction guide 7 will not much increase the curl of the recording paper 3. The introduction guide 7 serves to increase the tension of the recording paper 3, and besides the recording paper 3 is abruptly curved by the curl removal rod 6 into a generally U-shape in a direction opposite to the direction of curling of the recording paper 3, so that the curl is removed from the recording paper 3. After the printing is effected on the recording paper 3 over a predetermined length thereof, the recording paper 3 is cut by the cutter 8.

Figure 11:
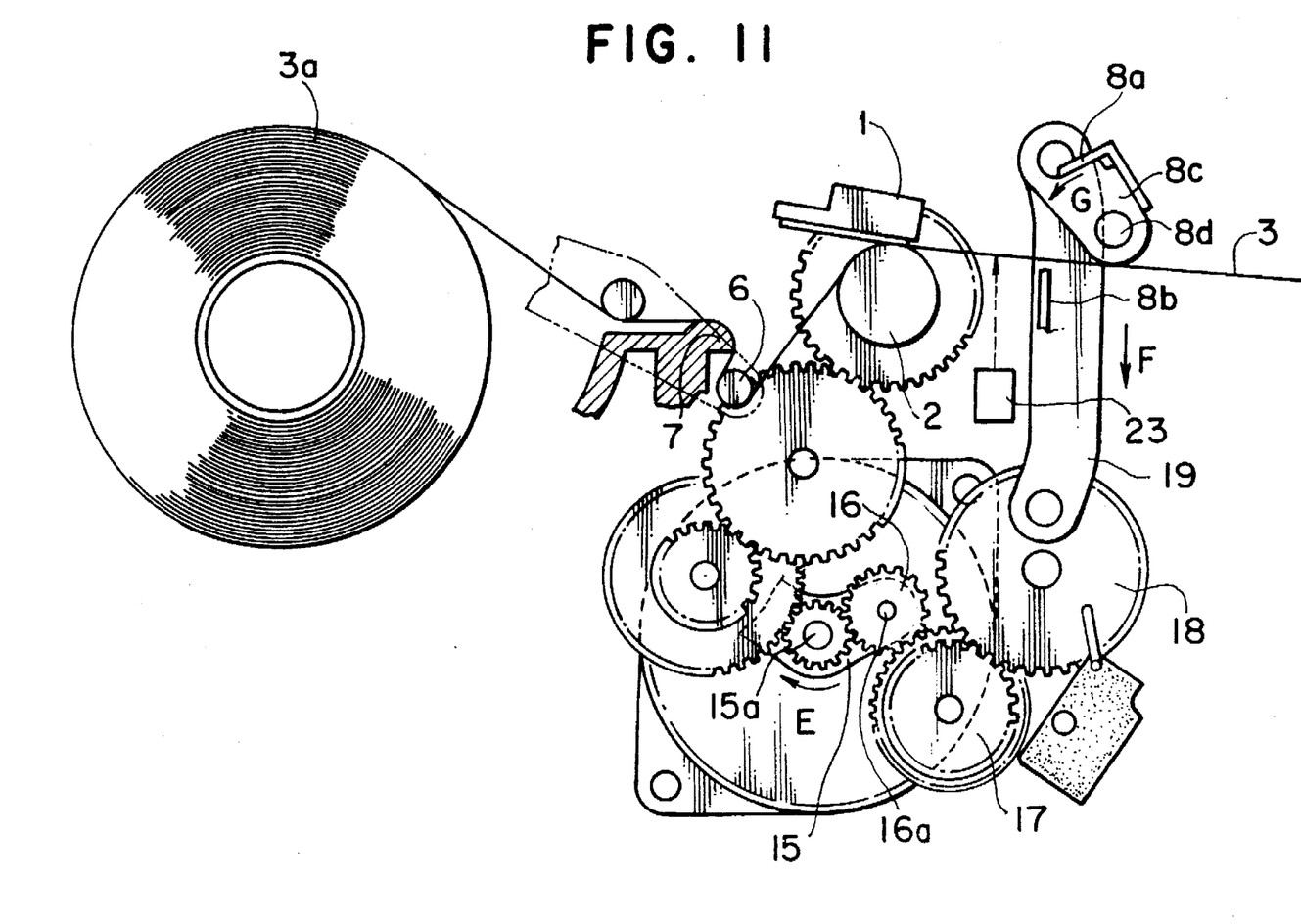
FIG. 11 is a view explanatory of the printing operation of the facsimile machine.
Figure 12:
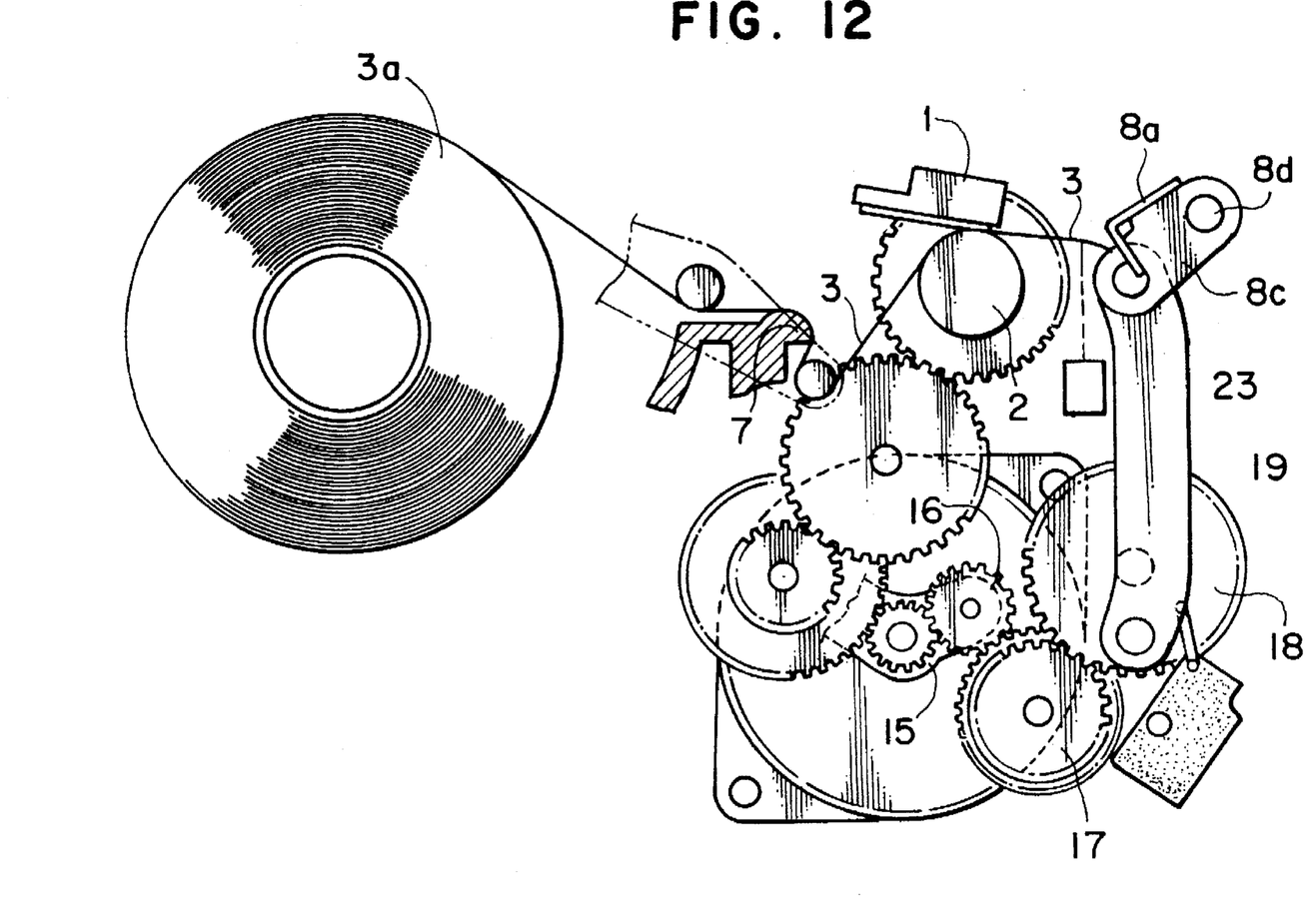
FIG. 12 is a view explanatory of the printing operation of the facsimile machine.

The cutting of the recording paper 3 will now be described in further detail. When the recording paper 3 is to be cut, the arm 15 is tilted right as shown in FIG. 11, and the power is transmitted from the switch gear 16 to the one-way gear 17, so that the rotation or power of the motor M1 is transmitted to the cutter 8 through the pinion gear of the motor M1, the switch gear 16, the one-way gear 17, the crank gear 18 and the crank arm 19. When the motor M1 rotates in the direction of arrow E, the crank arm 19 is moved downward in the direction of arrow F, and the holder plate 8c is rotated in a direction of arrow G to move the upper blade 8a of the cutter 8 downward, thereby cutting the recording paper 3 as shown in FIG. 12.

After the recording paper 3 is thus cut, the platen roller 2 is rotated in the reverse direction to move the leading edge (cut edge) of the recording paper 3 back, and when the paper sensor 23 detects the leading edge of the recording paper 3, the reverse rotation of the platen roller 2 is stopped. At this time, if the printing operation is to be continued, the leading edge of the recording paper 3 is moved back to the position in registry with the print head 1 as shown in FIG. 6. The leading edge of the recording paper 3 is thus moved back, and then the platen roller 2 is rotated in the normal direction, and the next page is printed. If a plurality of pages of a facsimile copy (record copy) or a plurality of pages of a copy are to be printed continuously, the curl removal rod 6 is not moved into its upper position, thus maintaining the recording paper transfer condition, until the printing of the last page is completed.

Figure 8:
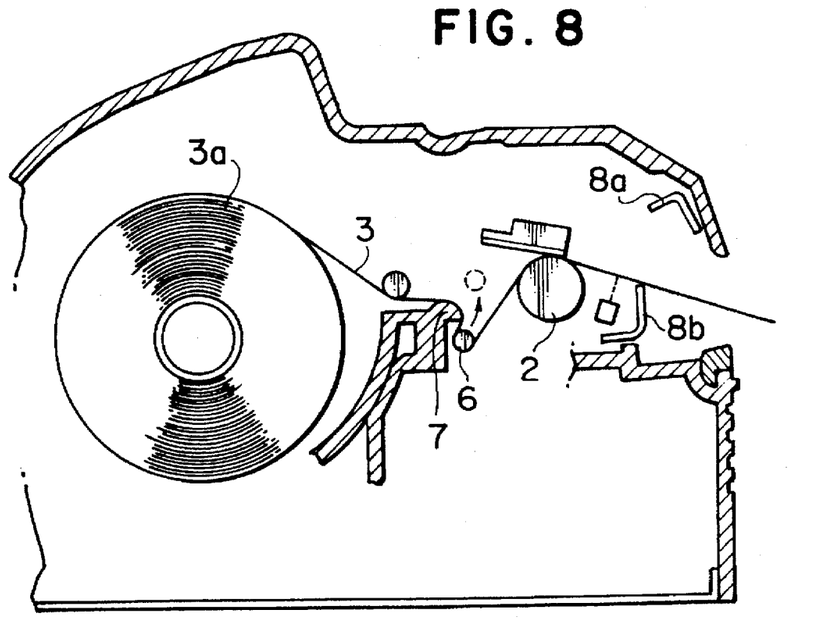
FIG. 8 is a view explanatory of the printing operation of the facsimile machine.
Figure 9:
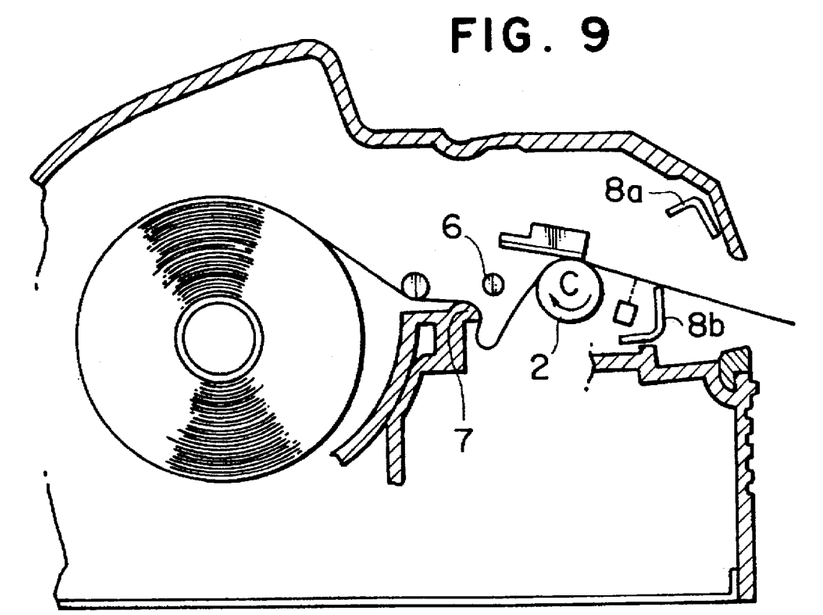
FIG. 9 is a view explanatory of the printing operation of the facsimile machine.

The operations, effected when stopping the printing operation, will now be described in further detail. After the printing of the last page is finished, thus completing the printing operation, the recording paper 3 is cut by the cutter 8, and then the platen roller 2 is rotated in the reverse direction to move the leading edge of the recording paper 3 back, as described above. If the paper sensor 23 properly detects the leading edge of the recording paper 3, it is determined that the recording paper 3 has been properly cut, and then the motor M2 is rotated in the reverse direction to move the curl removal rod 6 upward. Namely, the curl removal rod 6 is shifted from the condition of FIG. 8 to the condition of FIG. 9. Then, the motor M1 is rotated by a predetermined amount to rotate the platen roller 2 by a predetermined amount in its normal direction (indicated by arrow C), that is, in the paper feeding direction.

Figure 10:
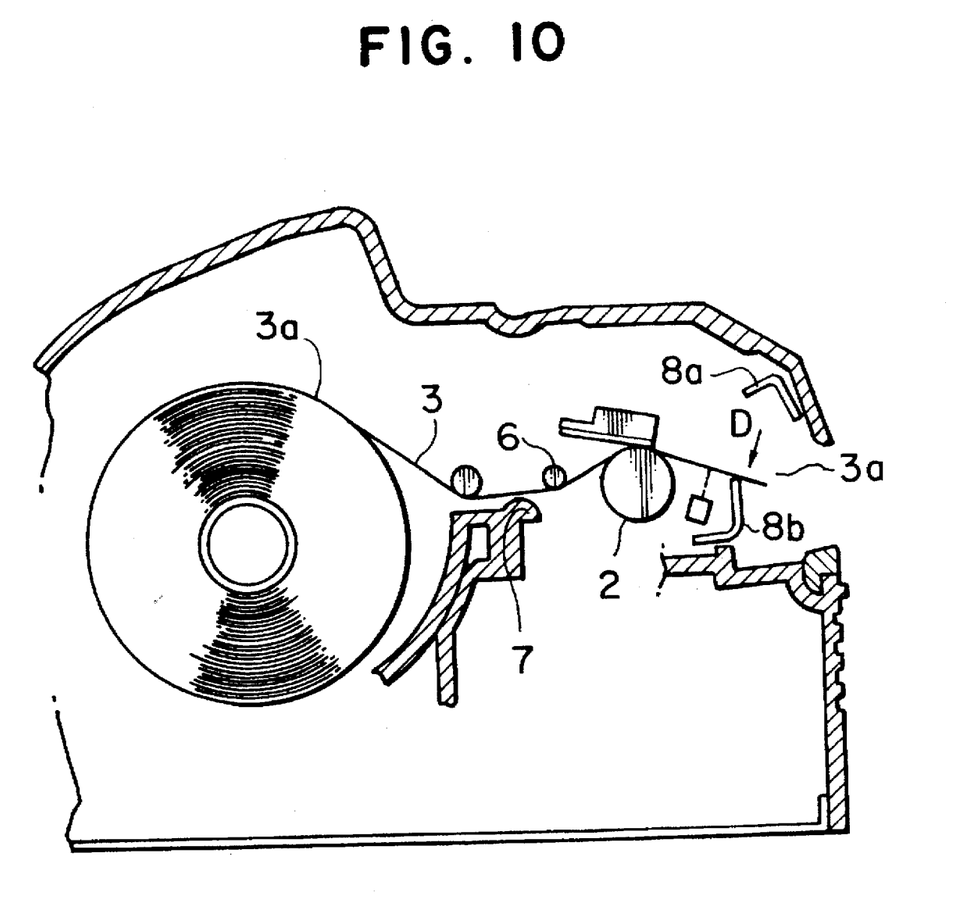
FIG. 10 is a view explanatory of the printing operation of the facsimile machine.

When the curl removal rod 6 is lifted, the recording paper 3 is kept slackened in the paper transfer condition. However, when the platen roller 2 is thus slightly rotated in the normal direction, the slack of the recording paper 3 is eliminated. As a result, the folding of the recording paper 3 by the introduction guide 7 and the curl removal rod 6 is prevented, and a curl due to a slack of the recording paper 3 is prevented from being formed on the recording paper 3. The leading edge (cut edge) 3a of the recording paper 3 is projected outwardly from a cutting position D of the cutter 8 as shown in FIG. 10. At this time, the cutter 8 is in its open condition (in which the upper blade 8a is held in its upper position), and therefore the leading edge 3a of the recording paper 3 can project outwardly without being interfered by the blade of the cutter 8. When a plurality of pages of a facsimile copy (record copy) or a plurality of pages of a copy are to be printed continuously, the curl removal rod 6 is moved upward after the printing of the last page is completed as described above, and the leading edge (cut edge) of the recording paper 3 is projected outwardly from the cutting position D of the cutter 8.

Next, reference is made in detail to the case where the jamming of the recording paper is detected. The printing of a certain page is finished, and then the recording paper 3 is cut, and then the platen roller 2 is rotated in the reverse direction so as to move the recording paper 3 back by the predetermined amount, and at this time if the leading edge of the recording paper 3 does not pass past the paper sensor 23, it is determined that the paper jamming has occurred. When such paper jamming is detected, the positioning arm 9 is tilted right, as indicated by broken lines in FIG. 3, by rotating the motor M2, and this movement of the positioning arm 9 is transmitted to the arm 15, so that the arm 15 is tilted left. As a result, the switch gear 16 is disengaged from the one-way gear 17, and the line of transmission of the power from the motor M1 to the cutter 8 is cut off. Therefore, the cutter 8 is rendered into a free condition, and the recording paper 3 can be easily removed.

As described above, in this embodiment, a curl is removed from the recording paper 3 by the curl removal rod 6 during the transfer of the recording paper, and when the printing operation is stopped, the platen roller is rotated in the normal direction (that is, the paper feed direction) by the predetermined amount to feed the recording paper by the predetermined amount, thereby preventing a curl from being formed on the recording paper 3.

In this embodiment, since the switch gear 16 is brought into and out of meshing engagement with the one-way gear 17 by the motor M2, the cutter can be rendered into a free condition when the jamming of the recording paper 3 occurs, and this facilitates the removal of the recording paper 3.

Since the switch gear 16 is brought into and out of meshing engagement with the next-stage gear, that is, the one-way gear 17 through the tilting of the arm 15, the power transmission line between the cutter 8 and the cutter drive motor M1 can be positively established and cut off.

The one-way gear 17 is of the double spur gear construction, and transmits the rotation to the next-stage crank gear 18 only when the motor M2 different from the cutter drive motor M1 rotates in the direction opposite to the direction of rotation when feeding the recording paper, and therefore the power transmission line between the cutter drive motor M1 and the cutter 8 can be more positively connected and interrupted.

In this embodiment, although the position of the curl removal rod 6 is controlled by rotating the motor M2 in the normal and reverse directions, the invention is not limited to such arrangement, and any other suitable means may be used in so far as the position of the curl removal rod 6 can be properly controlled. In this embodiment, thermosensitive paper or any other suitable paper can be used as the recording paper 3.

In this embodiment, although the cutter 8 is operated by the reverse rotation of the motor M1, and the switch gear 16 is operated by the reverse rotation of the motor M2, they may be operated by any other suitable means in so far as similar effects can be achieved. In this embodiment, the description has been made of the removal of a curl from the thermosensitive paper, the recording paper is not limited to thermosensitive paper, and any other suitable recording paper may be used, in which case similar effects can be achieved.

What is claimed is:

1. A printing apparatus comprising:
   a recording paper holding portion for holding a roll of recording paper;
   a transfer roller for transferring the recording paper;
   a print head;
   a curl removal member for flexing the recording paper drawn from said recording paper holding portion, thereby removing a curl from the drawn recording paper, said curl removal member being retractable into a position where said curl removal member does not flex the recording paper;
   a cutter for cutting the recording paper, said cutter being located at a distance from said transfer roll closer to a paper outlet port; and
   control means for rotating said transfer roller in a reverse direction, when starting printing, so as to move the recording paper back, stopping rotation of said transfer roller in said reverse direction when a leading end of the recording paper comes to a predetermined position near said print head, then starting rotation of said transfer roller in a normal direction for printing, driving said cutter so as to cut the recording paper when stopping printing, and thereafter, for rotating said transfer roller in said normal direction so as to feed the recording paper more or less.

2. A printing apparatus comprising:
   a recording paper holding portion for holding a roll of recording paper;
   a transfer roller for transferring the recording paper;
   a print head;
   a curl removal member for flexing the recording paper, drawn from said recording paper holding portion, to thereby remove a curl from the drawn recording paper, said curl removal member being retractable into a position where said curl removal member does not flex the recording paper;
   a cutter having a closable blade for cutting the recording paper, said cutter being located at a distance from said transfer roller closer to a paper outlet port;
   first control means for rotating said transfer roller when starting printing, so as to move the recording paper back, and for stopping rotation of said transfer roller in said reverse direction when a leading edge of the recording paper reaches the position of said print head, and subsequently starting rotation of said transfer roller in a normal direction for printing;
   second control means for driving said cutter so as to cut the recording paper when subsequently printing a next page, and thereafter promptly rotating said transfer roller in the reverse direction to move the recording paper back, and for stopping rotation of said transfer roller in said reverse direction when the leading edge of the recording paper reaches the position of said print head, so as to stop the leading edge of the recording paper at the position of said print head; and
   third control means for driving said cutter so as to cut the recording paper when stopping printing, and subsequently retracting said curl removal member while rotating said transfer roller in the normal direction to feed the recording paper more or less by such an amount that the leading edge of the recording paper is projected outwardly from a cutting position of said cutter.

3. A printing apparatus according to claim 2, in which drive means for driving said cutter is constituted by a motor which also serves as drive means for rotating said transfer roller, and there is provided switch means for establishing and cutting off a power transmission line between said cutter and said motor.

4. A printing apparatus according to claim 3, in which a one-way gear is provided in said power transmission line between said cutter and said motor, and said one-way gear transmits the power so as to drive said cutter only when said motor is rotated in a direction opposite to a direction of feeding the recording paper.

5. A printing apparatus according to claim 3, in which said switch means comprises a switch gear mounted on an arm, and said switch gear is brought into and out of meshing engagement with a next-stage one-way gear by pivoting said arm.

6. A printing apparatus comprising:
   a recording paper holding portion for holding a roll of recording paper;
   a transfer roller for transferring the recording paper;
   a print head;
   a curl removal member for flexing the recording paper, drawn from said recording paper holding portion, to thereby remove a curl from the drawn recording paper, said curl removal member being retractable into a position where said curl removal member does not flex the recording paper;
   a cutter having a closable blade for cutting the recording paper, said cutter being located at a distance from said transfer roller closer to a paper outlet port;
   a paper sensor provided between said print head and said cutter for detecting a leading edge of the recording paper;
   first control means for rotating said transfer roller in a reverse direction when starting printing, so as to move the recording paper back, stopping rotation of said transfer roller in said reverse direction when the leading edge of the recording paper reaches the position of said print head, and subsequently starting rotation of said transfer roller in a normal direction, thereby effecting the printing operation;
   second control means for driving said cutter when subsequently printing a next page, so as to cut the recording paper, then promptly rotating said transfer roller in the reverse direction, and stopping rotation of said transfer roller in the reverse direction when the leading edge of the recording paper reaches the position of said print head, so as to stop the leading edge of the recording paper at the position of said print head; and
   third control means for driving said cutter so as to cut the recording paper when stopping printing, and when said blade of said cutter is opened, rotating said transfer roller in the reverse direction to move the leading edge of the recording paper back, and then retracting said curl removal member when said paper sensor properly detects the leading edge of the recording paper, while said transfer roller is rotated in the normal direction to feed the recording paper more or less by such an amount that the leading edge of the recording paper is projected outwardly from a cutting position of said cutter.

7. A printing apparatus comprising:
   a recording paper holding portion for holding a roll of recording paper;
   a transfer roller for transferring the recording paper;
   a print head;

a curl removal member for flexing the recording paper drawn from said recording paper holding portion, to thereby remove a curl from the drawn recording paper, said curl removal member being retractable into a position where said curl removal member does not flex the recording paper;

a cutter having a closable blade for cutting the recording paper, said cutter being located at a distance from said transfer roller closer to a paper outlet port;

a motor serving as drive means for rotating said transfer roller, and also serving as drive means for driving said cutter;

switch means for establishing and cutting off a power transmission line between said cutter and said motor;

a paper sensor provided between said print head and said cutter for detecting a leading edge of the recording paper;

first control means for rotating said transfer roller when starting printing in a reverse direction, so as to move the recording paper back, and stopping rotation of said transfer roller in the reverse direction when said paper sensor delivers a detection signal indicating that the leading edge of the recording paper reaches the position of said print head while causing said switch means to establish said power transmission line, and starting rotation of said transfer roller in a normal direction, thereby effecting printing;

second control means for rotating said motor when subsequently printing a next page, so as to drive said cutter to cut the recording paper, then promptly rotating said transfer roller in the reverse direction to move the recording paper back, and stopping said transfer roller in the reverse direction when said paper sensor delivers a signal indicating that the leading edge of the recording paper reaches the position of said print head, so as to stop the leading edge of the recording paper at the position of said print head;

third control means for rotating said motor when stopping printing so as to drive said cutter to cut the recording paper, and then rotating said transfer roller in the normal direction to feed the recording paper more or less to remove a slack from the recording paper, and causing said switch means to cut off said power transmission line between said cutter and said motor; and fourth control means for rotating said transfer roller in the reverse direction when starting printing, so as to move the recording paper back, determining paper jamming if said paper sensor does not detect the leading edge of the recording paper even though said transfer roller is rotated by a predetermined amount in the reverse direction, soon stopping rotation of said transfer roller, and causing said switch means to cut off said power transmission line between said cutter and said motor.

8. A printing apparatus comprising:

a recording paper holding portion for holding a roll of recording paper;

a transfer roller for transferring the recording paper;

a print head;

a curl removal member for flexing the recording paper, drawn from said recording paper holding portion in an operative position, to thereby remove a curl from the drawn recording paper, said curl removal member being retractable into an inoperative position where said curl removal member does not flex the recording paper, said transfer roller being located at a distance from said curl removal member closer to a paper outlet port, and said print head being located at a distance from said curl removal member closer to said paper outlet port;

first drive means for moving said curl removal member;

a cutter for cutting the recording paper;

second drive means for driving said cutter;

first control means for rotating said transfer roller in a reverse direction when starting a printing operation, said transfer roller being rotated in a reverse direction to move the recording paper back, stopping said transfer roller in the reverse direction when a leading edge of the recording paper reaches the position of said print head, while causing said first drive means to move said curl removal member into said operative position where said curl removal member removes a curl from the recording paper, and starting rotation of said transfer roller in a normal direction, thereby effecting printing;

second control means for driving said cutter when subsequently printing a next page, so as to cut the recording paper, then promptly rotating said transfer roller in the reverse direction, and stopping rotation of the transfer roller in the reverse direction when the leading edge of the recording paper reaches the position of said print head, so as to stop the leading edge of said recording paper at the position of said print head; and third control means for driving said cutter when stopping the printing operation, so as to cut the recording paper, then causing said first drive means to retract said curl removal member into said inoperative position, and rotating said transfer roller in the normal direction to feed the recording paper more or less.

9. A printing apparatus according to claim 8, in which there is provided a curl removal member position-control mechanism which comprises a pivotal arm, and said curl removal member is mounted on a free end of said pivotal arm, and when said arm is pivotally moved in one direction, said curl removal member is shifted into said operative position, and when said arm is pivotally moved in a direction opposite to said one direction, said curl removal member is shifted into said inoperative position.

10. A printing apparatus according to claim 9, in which said curl removal member has a circular cross-section having a diameter, and an introduction guide, having a diameter larger than that of said curl removal member, is stationarily provided between said recording paper holding portion and said curl removal member, and when said curl removal member is moved into said operative position, the recording paper, fed from said recording paper holding portion, is first curved by said introduction guide in a direction to increase a curl thereof, and then is abruptly curved by said curl removal member in a direction opposite to a direction of curling of said recording paper.

* * * * *